Aug. 29, 1950 E. MORRISON 2,520,162
BUSHING REPLACER
Filed Aug. 14, 1947
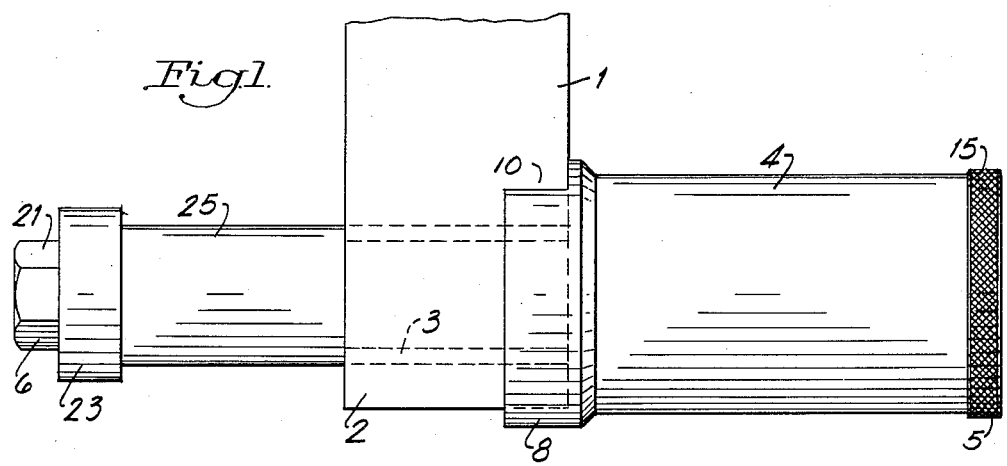
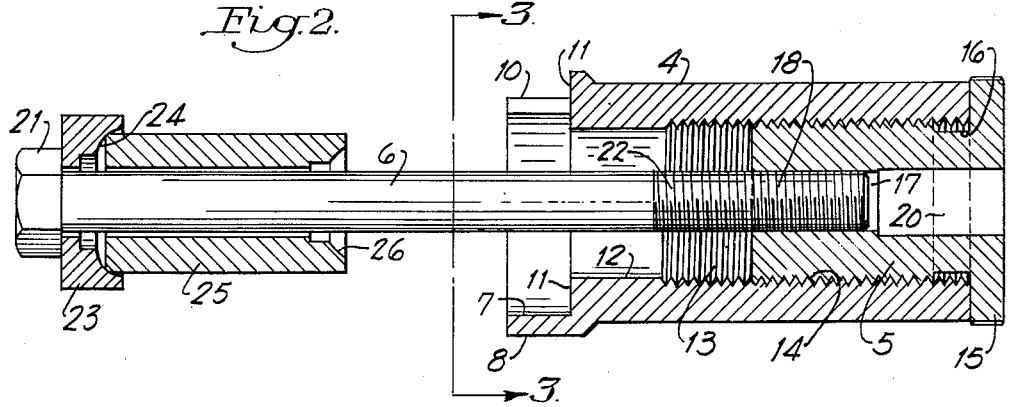
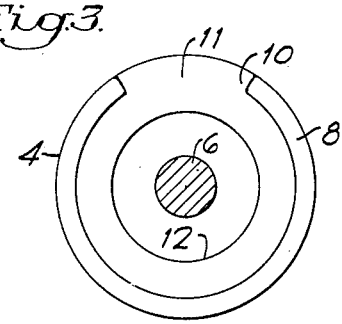
INVENTOR.
ERNEST MORRISON
BY
Edward A. Laurena
HIS ATTORNEY.

Patented Aug. 29, 1950

2,520,162

UNITED STATES PATENT OFFICE 2,520,162

BUSHING REPLACER

Ernest Morrison, Pittsburgh, Pa.

Application August 14, 1947, Serial No. 768,593

1 Claim. (Cl. 29—283)

This invention relates generally to tools for replacing bushings and more particularly to a hand tool for removing and replacing bushings in leaf springs and the like.

The principal object is the provision of a readily manipulated tool for removing and inserting bushings into eyes such as frequently formed in the ends of leaf springs and the like.

Another object is the provision of an improved tool for replacing spring bushings with increased ease and speed.

Another object is the provision of an improved bushing replacer providing screws of opposite hand for the purpose of increasing the speed of operation of the tool and at the same time provide a more uniform distribution of the forces during the time of replacing bushings.

Another object is the provision of a spring bushing replacer having a socket arranged to receive the bushing being withdrawn and arranged to be locked against rotation relative to the spring.

Other objects and advantages appear hereinafter in the following description and claim:

A practical embodiment illustrating the principles of this invention as shown in the accompanying drawing wherein;

Fig. 1 is a plan view of the bushing replacer shown adapted to a spring;

Fig. 2 is a section view of the bushing replacer showing each of the parts thereof and their relation to one another;

Fig. 3 is a view taken on the line 3—3 of Fig. 2.

Referring to the drawing, 1 represents the end of a leaf spring having the eye 2 formed on the end thereof and which contains the old bushing member 3 in tight frictional engagement. The shackle bolt of this bushing has been removed and the bushing puller assembled thereon.

The bushing puller comprises the tubular body member 4, the sleeve 5 and the draw rod or bolt 6. The tubular body member 4 is provided with an enlarged bore 7 formed by the integral arcuate flange 8. A section of approximately sixty degrees of the flange 8 is removed as indicated at 10 in Figs. 1 and 3 which laterally exposes the shoulder 11 between the larger bore 7 and the inner smaller bore 12. The bore 12 is internally threaded for the greater part of its length with a left hand thread 13 to receive the complementary external thread 14 of the sleeve 5.

The outer end of the sleeve 5 is provided with the radial flange 15 the perimeter of which is knurled as indicated. The sleeve 5 is provided with the recess 16 between the thread 14 and the flange 15. The bore 17 of the sleeve is made in two sections, the internally right hand threaded section 18 and the larger square or non-round bore or socket 20 for receiving a complementary shaped crank with which to rotate the sleeve in the socket.

The pull rod or bolt 6 is provided with the ordinary head 21 and the threaded end 22 that fits the thread bore section 18. A bushing abutment washer 23 is placed under the head of the bolt 6 and is provided with an annular hardened surface 24 which is substantially a sector of a spherical surface for the purpose of aligning the bushing or bushing abutment chaser member 25 that is placed on the bolt 6. If the bushing that is to be inserted in the spring eye is sufficiently strong to withstand the compression forces without deformation it may be employed as the chaser member for forcing the worn bushing 3 from the eye of the spring. However, if the new bushing would be deformed or otherwise damaged by making it force the old frozen bushing from its seat then the chaser member 25 should be employed. A chaser member is preferably slightly smaller in diameter than the bushing so that it will readily slide through the eye 2 in forcing the bushing out the other side and may be readily removed when the bushing has been ejected. The outer end of the chaser member 25 is preferably provided with the combination spherical and cylindrical socket 26 which is formed to properly fit the end of the particular bushing being replaced.

In operation the tool is assembled on the spring as shown in Fig. 1 with the sleeve 5 screwed to its full depth in the threaded bore 13. The bolt 6, with the washer 23 and the chaser member 25 placed thereon, is inserted through the bore of the old bushing 3 and threaded tightly into the inner threaded bore 18 of the sleeve 5. The opening 10 of the flange 8 is turned to allow the edge of the leaf spring to rest against the shoulder 11 and prevent relative rotary movement between the leaf spring 1 and the body member 4. A crank wrench having a squared end is inserted into the square socket 20 and rotated in a clockwise direction when viewing the end of the sleeve 5 from the right. Rotation of the sleeve 5 in a clockwise direction causes its left hand thread to unscrew the sleeve 5 from the body 4 and it moves to the right out of the threaded bore 13. The pressure exerted by the head of the bolt 6 on the abutment washer and the chaser prevents these three parts from rotating. When the crank turns the sleeve 5 it rotates relative to the bolt 6 and since the bolt has a right hand threaded engagement with the sleeve the bolt 6 is drawn into the threaded bore 18 of the sleeve. Thus, rotation of the sleeve 5 in a clockwise direction causes the bolt to be drawn to the right and the chaser forces the bushing 3 into the bore 12 of the body 4. Each complete turn of the sleeve 5 causes the bolt 6 to advance the bushing 3 a distance equal to the sum of the pitch of the threads on the sleeve 5 and the bolt 6. If they have the same pitch, such as one-sixteenth of an inch, then the bushing is advanced one-eighth of an inch for each complete turn of the sleeve 5. The sleeve may then be quickly removed and a new one inserted in a relatively short time. The large diameter of the threads 14 on the sleeve provides long wear of the tool. This tool is quite small and light as compared to equivalent tools as the double reversed head threads provide a short compact nut that is not possible with single thread bushing replacers. These are particular advantages of this invention.

I claim:

An automobile leaf spring bushing replacer comprising a tubular body member having a threaded bore sufficiently large to receive a bushing, an integral locking flange on one end of the tubular body member to fit over the eye of the leaf spring, said flange having a gap through which the leaf spring extends and engages to prevent relative rotary movement between the tubular body member and the leaf spring, an externally threaded sleeve engaging in the threaded bore of the tubular body member, a threaded bore of the opposite hand in said sleeve to receive a headed draw bolt, a radial flange on said sleeve with its perimetral surface extending beyond the threaded bore of the tubular body member, and socket means in the outer end of the sleeve to rotate the same.

ERNEST MORRISON.

REFERENCES CITED

The following references are of record in the file of this patent:

UNITED STATES PATENTS

| Number | Name | Date |
|---|---|---|
| 327,612 | Stark | Oct. 6, 1885 |
| 470,238 | Goodman | Mar. 8, 1892 |
| 1,310,270 | Atzberger | July 15, 1919 |
| 1,315,536 | Usher | Sept. 9, 1919 |
| 1,431,378 | Derry | Oct. 10, 1922 |
| 1,521,202 | Osgood | Dec. 30, 1924 |
| 1,599,176 | Hersee | Sept. 7, 1926 |
| 1,897,737 | Snarr | Feb. 14, 1933 |
| 2,096,472 | Schmidt | Oct. 19, 1937 |

FOREIGN PATENTS

| Number | Country | Date |
|---|---|---|
| 154,829 | Great Britain | Dec. 9, 1920 |
| 374,155 | Great Britain | June 9, 1932 |
| 476,140 | Germany | May 10, 1929 |